US009432648B2

(12) United States Patent
Ananthapurbacche

(10) Patent No.: US 9,432,648 B2
(45) Date of Patent: Aug. 30, 2016

(54) ADAPTIVE PAL FIELD COMBER

(75) Inventor: Ravi Ananthapurbacche, Bangalore (IN)

(73) Assignee: STMicroelectronics International N.V., Amsterdam (NL)

( * ) Notice: Subject to any disclaimer, the term of this patent is extended or adjusted under 35 U.S.C. 154(b) by 1015 days.

(21) Appl. No.: 13/296,965

(22) Filed: Nov. 15, 2011

(65) Prior Publication Data

US 2013/0120650 A1 May 16, 2013

(51) Int. Cl.
*H04N 9/78* (2006.01)

(52) U.S. Cl.
CPC ....................................... *H04N 9/78* (2013.01)

(58) Field of Classification Search
CPC ............... H04N 11/165; H04N 9/78
See application file for complete search history.

(56) References Cited

U.S. PATENT DOCUMENTS

| 5,155,582 | A | * | 10/1992 | Tokoi et al. | 348/663 |
| 5,473,389 | A | * | 12/1995 | Eto et al. | 348/669 |
| 2002/0167591 | A1 | * | 11/2002 | Kwon et al. | 348/155 |
| 2004/0201781 | A1 | * | 10/2004 | Kobayashi et al. | 348/663 |
| 2005/0134740 | A1 | * | 6/2005 | Bacche | 348/638 |
| 2006/0125965 | A1 | * | 6/2006 | Vandenbussche | 348/663 |
| 2008/0122982 | A1 | * | 5/2008 | Lin | H04N 9/78 348/666 |

* cited by examiner

*Primary Examiner* — Sath V Perungavoor
*Assistant Examiner* — Peter D Le
(74) *Attorney, Agent, or Firm* — Gardere Wynne Sewell LLP

(57) ABSTRACT

A video decoder includes an adaptive comber to generate a combed video image, and the adaptive comber selectively combs using 2D combing, frame combing, and field combing.

23 Claims, 7 Drawing Sheets

PAL FIELD CHROMA PHASE DIAGRAM

ADAPTIVE PAL FIELD COMBER

FIELD OF THE INVENTION

The present invention relates to an adaptive phase alternating line field comber based video decoder. The invention further relates to but is not limited to an adaptive phase alternating line field comber as part of a television receiver.

BACKGROUND OF THE INVENTION

Analogue video are video signals wherein the image information is stored by analogue modulation on an electrical signal. There are many established color analogue video formats. Such color analogue video system specifies the video image in terms of the luminance or luma (Y) and chrominance or chroma (C) of the image. An analogue video decoder can receive in a single channel or signal a color analogue encoder video signal for example from a composite video input or from a television broadcast encoded analogue signal. The luma and chroma components of the analogue video signal can then be separated in such a way that they can then be output to a screen or display.

Analogue video is used in both consumer and professional applications and is found in many terrestrial television broadcast systems. For example, composite video, a format of analogue television picture (picture only) signals contain all the required video information including color in a single signal. Composite video is sometimes known as CVBS (composite video baseband signal). Composite video signals can be found, for example, in many standard formats such as NTSC (National Television System Committee), PAL (Phase Alternating Line), and SECAM (Sequential Color with Memory) as well as the various sub-standards of these standards such as PAL-M, PAL-N, NTSC443, PAL-60. The composite signal is a composite of three source signals Y (luma), U and V (representing hue and saturation or chrominance). The typical analogue video decoder receives such a composite video signal and separates these into the three source signals. However in order to apply correct color decoding techniques to separate the luma and chroma to produce the correct image on the final output screens, it is important to detect the correct mode or standard applied.

For PAL video decoding, in order to improve the luma/chroma separation, additional processing of the CVBS signals can be carried out. For example a process of 2D (spatial filtering) decoding and 3D (temporal, the inter frame or field comb filtering) decoding can be performed to attempt to improve the image quality. Performing field combing based only on motion detection can generate field motion artifacts due to field motion in phase subcarriers taps being spatially displaced.

SUMMARY OF THE INVENTION

Embodiments of the present application aim to address the above problems.

There is provided according to the disclosure a video decoder comprising: an adaptive comber configured to generate combed video image, wherein the adaptive comber is configured to selectively comb using at least one of: 2D combing, frame combing, and field combing.

In such embodiments the video decoder can thus comprise an adaptive comb block comprising adaptive 2D combing, adaptive frame combing, and an adaptive field combing and being based on (chroma luma determination) CLD, field motion and Vlogic (vertical correlation) status.

Furthermore in such embodiments the adaptive comb block can be configured to do frame combing when detecting no field motion, else based on the levels of field motion, CLD and vlogic status perform field combing or 2D combing.

The video decoder may further comprise an adaptive comb controller configured to generate at least one control signal for the adaptive comber to select from the at least one of: 2D combing, frame combing, and field combing.

The adaptive comb controller may comprise at least one of: a chroma-luma status determiner, a vertical image correlator, and a spatio-temporal image correlator.

The adaptive comb controller may comprise a controller logic configured to generate at least one control signal dependent on the output of the at least one of: chroma-luma status determiner, vertical image correlator, and spatio-temporal image correlator.

The adaptive comber may comprise at least two of: a 2D comber, a frame comber, and a field comber, and the adaptive comb further may comprise at least one blender configured to receive signals from the at least two of: the 2D comber, frame comber, and field comber wherein the at least one blender is configured to selectively combine the received signals dependent on the at least one control signal.

The adaptive comber may comprise the frame comber, wherein the frame comber is configured to be enabled for a region dependent on the spatio-temporal image correlator determining a field motion value less than a determined value.

The adaptive comber may comprise the field comber, wherein the field comber is configured to be enabled for a region dependent on the spatio-temporal image correlator determining the region has a field motion value less than a further determined value, and the chroma-luma status determiner determining the region does not have a chroma signature and the vertical image correlator determining that the region has vertical correlation less than a determined correlation threshold.

The adaptive comber may comprise the 2D comber, wherein the 2D comber is configured to be enabled for a region dependent on the spatio-temporal image correlator determining the region has a field motion value greater than a further determined value and the vertical image correlator determining that the region has vertical line correlation greater than a determined correlation threshold.

The adaptive comber may be configured to adaptively perform different combing operations on the same image.

The adaptive comber may comprise a tap selector configured to select picture elements to comb.

The tap selector may be configured to select picture elements to comb dependent on a combination of: a chroma-luma status value of the image signal, a vertical image correlation value of the image, and a spatio-temporal image correlation value.

The adaptive comber may comprise a tap blender configured to blend filter elements selected dependent on a combination of: a chroma-luma status value of the image signal; a vertical image correlation value of the image; and a spatio-temporal image correlation value.

The tap selector may be configured to select: a first picture signal element, an in-phase picture signal element one frame away from the picture signal element, and an out-of-phase picture signal element from the adjacent field picture signal, for field combing dependent on at least the chroma-luma status value of the image indicating the image signal does not have a chroma sub carrier signature.

A television receiver may comprise the video decoder as discussed herein.

An integrated circuit may comprise the video decoder as discussed herein.

A video player may comprise the video decoder as discussed herein.

A chipset may comprise the video decoder as discussed herein.

According to a second aspect there is provided a method for video decoding comprising adaptively combing a video signal, wherein the adaptive combing comprises selectively combing using at least one of: 2D combing, frame combing, and field combing.

The method may further comprise: generating at least one control signal to selectively comb using the at least one of: 2D combing, frame combing, and field combing.

Generating at least one control signal may comprise generating the at least one control signal dependent on determining a chroma-luma status of the video signal.

Generating at least one control signal may comprise generating the at least one control signal dependent on determining a vertical image correlation value of the video signal.

Generating at least one control signal may comprise generating the at least one control signal dependent on determining a spatio-temporal image correlation value.

Adaptively combing a video signal may comprise: performing at least two of: 2D combing, frame combing, and field combing; and selectively combining an output from the at least two of: 2D combing, frame combing, and field combing dependent on the at least one control signal.

Adaptively combing may comprise enabling frame combing dependent on determining a field motion value less than a determined value.

Adaptively combing may comprise enabling field combing for a region dependent on determining the region has a field motion value less than a further determined value, determining the region does not have a chroma signature, and determining that the region has vertical correlation less than a determined correlation threshold.

Adaptively combing may comprise enabling 2D combing for a region dependent on determining the region has a field motion value greater than a further determined value and the region has vertical line correlation greater than a determined correlation threshold.

Adaptively combing may comprise performing different combing operations on the same image.

Adaptively combing may comprise selecting at least one picture element to comb.

Selecting at least one picture element to comb may comprise selecting at least one picture element dependent on a combination of: a chroma-luma status value of the image signal, a vertical image correlation value of the image, and a spatio-temporal image correlation value.

Adaptively combing may comprise blending combing output elements dependent on a combination of: a chroma-luma status value of the image signal, a vertical image correlation value of the image, and a spatio-temporal image correlation value.

Selecting at least one picture element to comb may comprise selecting at least: a first picture signal element, an in-phase picture signal element one frame away from the picture signal element, and an out-of-phase picture signal element from the adjacent field picture signal, for field combing dependent on at least the chroma-luma status value of the image indicating the image signal does not have a chroma sub carrier signature.

A processor-readable medium encoded with instructions that, when executed by a processor, perform a method for decoding video as discussed herein.

An apparatus comprising at least one processor and at least one memory including computer code for one or more programs, the at least one memory and the computer code configured to with the at least one processor cause the apparatus to at least perform a method as discussed herein.

According to a fifth aspect there is provided a video decoder comprising: means for adaptively combing a video signal, wherein the adaptive combing comprises selectively combing using at least one of: 2D combing, frame combing, and field combing.

The video decoder may further comprise: means for controlling the means for adaptively combing the video signal to selectively comb using the at least one of: 2D combing, frame combing, and field combing.

The means for controlling the means for adaptively combing may comprise means for generating at least one control signal dependent on determining a chroma-luma status of the video signal.

The means for controlling the means for adaptively combing may comprise means for generating at least one control signal dependent on determining a vertical image correlation value of the video signal.

The means for controlling the means for adaptively combing comprises means for generating at least one control signal dependent on determining a spatio-temporal image correlation value.

The means for adaptively combing a video signal may comprise: at least two of: means for 2D combing, means for frame combing, and means for field combing; and means for selectively combining an output from the at least two of: means for 2D combing, means for frame combing, and means for field combing dependent on the at least one control signal.

The means for controlling the means for adaptively combing may comprise means for enabling the means for frame combing dependent on determining a field motion value less than a determined value.

The means for controlling the means for adaptively combing may comprise means for enabling the means for field combing for a region dependent on determining the region has a field motion value less than a further determined value, determining the region does not have a chroma signature, and determining that the region has vertical correlation less than a determined correlation threshold.

The means for controlling the means for adaptively combing may comprise means for enabling the means for 2D combing for a region dependent on determining the region has a field motion value greater than a further determined value and the region has vertical line correlation greater than a determined correlation threshold.

The means for adaptively combing may comprise means for performing different combing operations on the same image.

The means for adaptively combing may comprise means for selecting at least one picture element to comb.

The means for selecting at least one picture element to comb may comprise means for selecting at least one picture element dependent on a combination of: a chroma-luma status value of the image signal, a vertical image correlation value of the image, and a spatio-temporal image correlation value.

The means for adaptively combing may comprise means for blending combing output elements dependent on a combination of: a chroma-luma status value of the image signal; a vertical image correlation value of the image; and a spatio-temporal image correlation value.

The means for selecting at least one picture element to comb may comprise means for selecting at least: a first picture signal element, an in-phase picture signal element one frame away from the picture signal element, and an out-of-phase picture signal element from the adjacent field picture signal, for field combing dependent on at least the chroma-luma status value of the image indicating the image signal does not have a chroma sub carrier signature.

BRIEF DESCRIPTION OF THE FIGURES

For better understanding of the present application, reference will now be made by way of example to the accompanying drawings in which.

DETAILED DESCRIPTION OF THE PREFERRED EMBODIMENTS

The following describes in further detail suitable apparatus and possible mechanisms for the provision of adaptive field combing.

Figure 1:
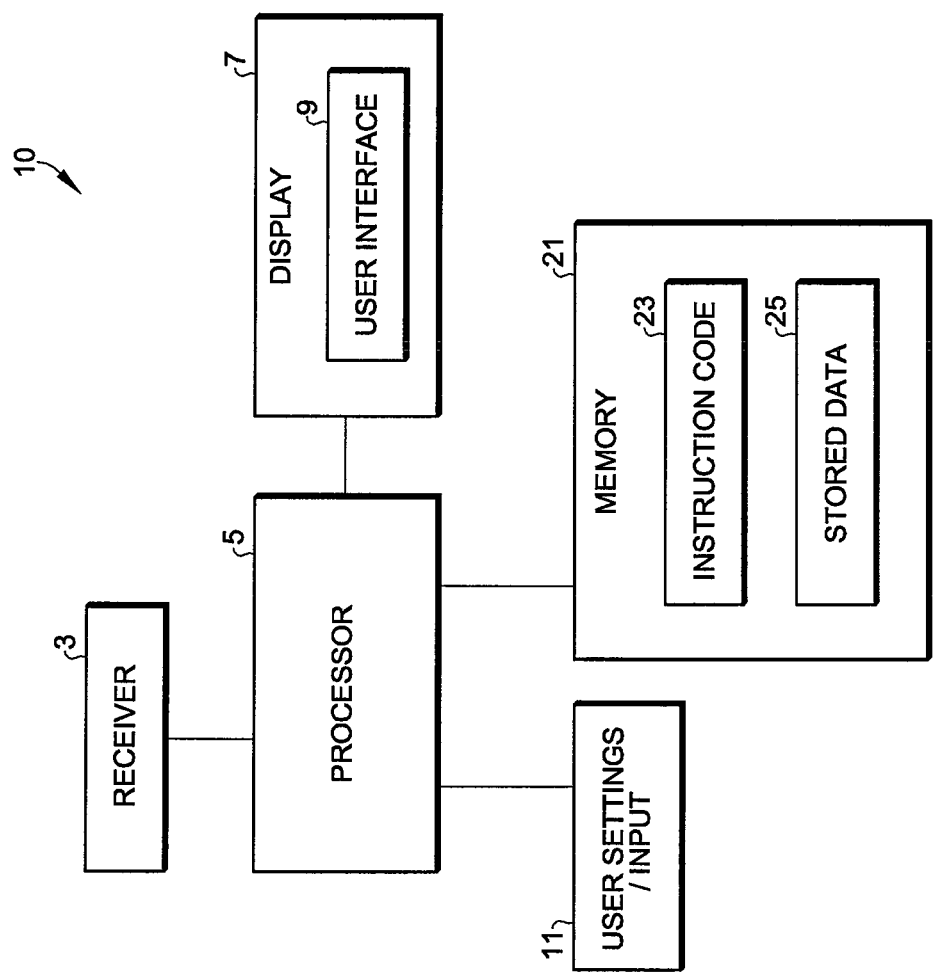
FIG. 1 shows schematically a system suitable for employing a video decoder according to some embodiments of the application.

With respect to FIG. 1 an example electronic device or apparatus 10 is shown within which embodiments of the application can be implemented.

The apparatus 10 in some embodiments comprises a receiver configured to receive a radio frequency modulated television and/or video signal and output the analogue video signal to the processor 5. In some embodiments the receiver can be controlled by the processor to demodulate/select the channel to be received.

The apparatus 10 in some embodiments comprises a processor 5 which can be configured to execute various program codes. The implemented program codes can comprise video decoding for receiving the received video data and decoding and outputting the data to the display 7. The implemented program codes can be stored within a suitable memory.

In some embodiments the processor 5 can be coupled to memory 21. The memory 21 can further comprise an instruction code section 23 suitable for storing program codes implementable upon the processor 5. Furthermore in some embodiments the memory 21 can comprise a stored data section 25 for storing video data. The memory 21 can be any suitable storage means. In some embodiments the memory 21 can be implemented as part of the processor in a system-on-chip configuration.

The apparatus 10 can further comprise a display 7. The display can be any suitable display means featuring technology for example cathode ray tube (CRT), light emitting diode (LED), variably backlight liquid crystal display (LCD) for example LED lit LCD, organic light emitting diode (OLED), and plasma display. The display 7 can furthermore be considered to provide a graphical user interface (GUI) providing a dialog window in which a user can implement and input how the apparatus 10 displays the video. In some embodiments the apparatus can be configured to communicate with a display remote from the physical apparatus by a suitable display interface, for example a High Definition Multimedia Interface (HDMI) or a Digital Video Interface (DVI) or be remodulated and transmitted to the display.

The apparatus 10 further can comprise a user input or user settings input apparatus 11. The user input can in some embodiments be a series of buttons, switches or adjustable elements providing an input to the processor 5. In some embodiments the user input 11 and display 7 can be combined as a touch sensitive surface on the display, also known as a touch screen or touch display apparatus.

Embodiments of the application attempt to perform adaptive field combing based on information such as field motion, (Chroma/Luma Detect) CLD status, V logic status (in other words whether there is correlation between lines of the field). Thus in embodiments of the application, field combing is enabled for specific image scenarios based on the chroma/luma status (CLD) of the current and previous field pixel or block of pixels being analyzed and the spatial/vertical correlation such that the field combing artifacts are reduced. In other words, where field combining is expected to improve image quality in the region, it can be applied but then be disabled in other regions.

Figure 5:
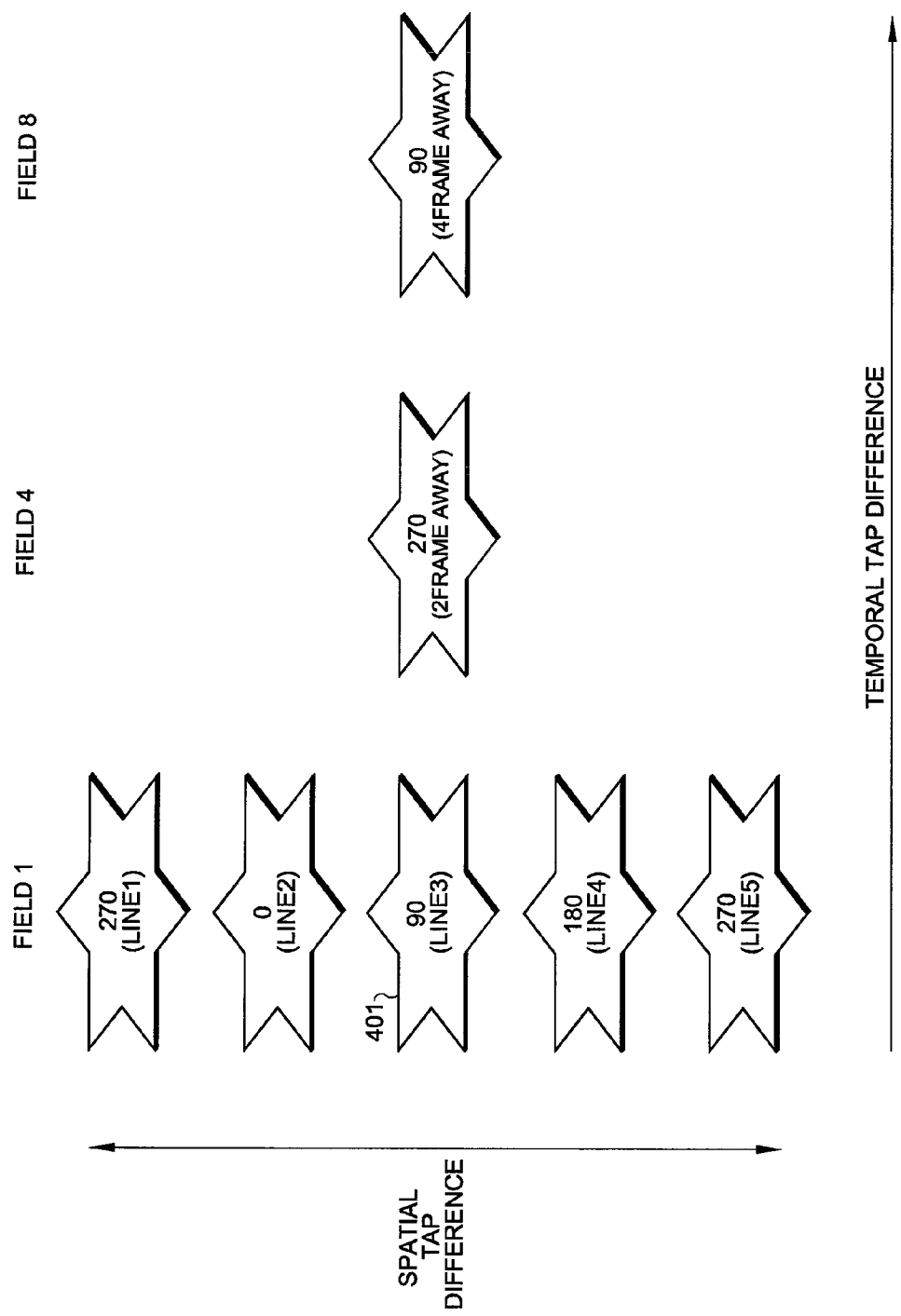
FIG. 5 shows schematically an example of frame combing filter taps for the adaptive comber according to some embodiments of the application.

An example of a PAL comb tap arrangement is shown with respect to FIG. 5. FIG. 5 shows a pixel under investigation 401 which is in Line 3 and with phase 90°, and PAL comb points or taps across two lines above (the one line above being line 2 with phase of 0° and the two line above being line 1 with phase of 270°) and below (the one line below being line 4 with phase of 180° and the two line below being line 5 with phase of 270°) line of the same field (Field 1) and across two frames away (Field 4) and four frames away (Field 8) in the $8^{th}$ field sequence. For temporal frame combing the 4 fields away tap (in other words 2 frame away tap, as one frame consists of two fields) is because the combing taps have to be 180 degrees out of phase, and in case of PAL the taps which are 4 fields away are 180 degrees out of phase. The field 8 tap is 4 frames away and can in some examples be used for motion detection in frame motion processing. This is because for motion check the taps have to be in phase and for PAL, the taps which are 4 frames away are in phase.

As can be seen in FIG. 5, so that the phases of the input to the temporal tap values are suitable for combing; they are required to be either "in phase" or 180 degrees out of phase and therefore the temporal comb tap used is two frames (or four fields) away and the frame motion check requires "in phase" inputs and therefore requires a distance of 4 frames (or 8 fields). Furthermore the filter taps in the same field as the pixel are the two-dimensional comb filter taps for a number of lines above and below the current line.

Thus in some embodiments an adaptive filter can be used where dependent on determining image motion then the filter can use only the two-dimensional combing filter configuration. These 2-D comb filters can be configured to use five line, three line or notch filtering (where 5 taps, 3 taps or a single tap respectively are used as the input to the filter).

In some embodiments so to enable better spatial combing, the line tap samples should be as close as possible to the current line being analyzed but because of field interlacing to form complete frames (and the 2 line across comb tap configuration in PAL systems) the combing line taps are "far away" from the analyzed pixel and thus combing is not as efficient as the probability of correlation with the analyzed pixel is less.

Figure 6:
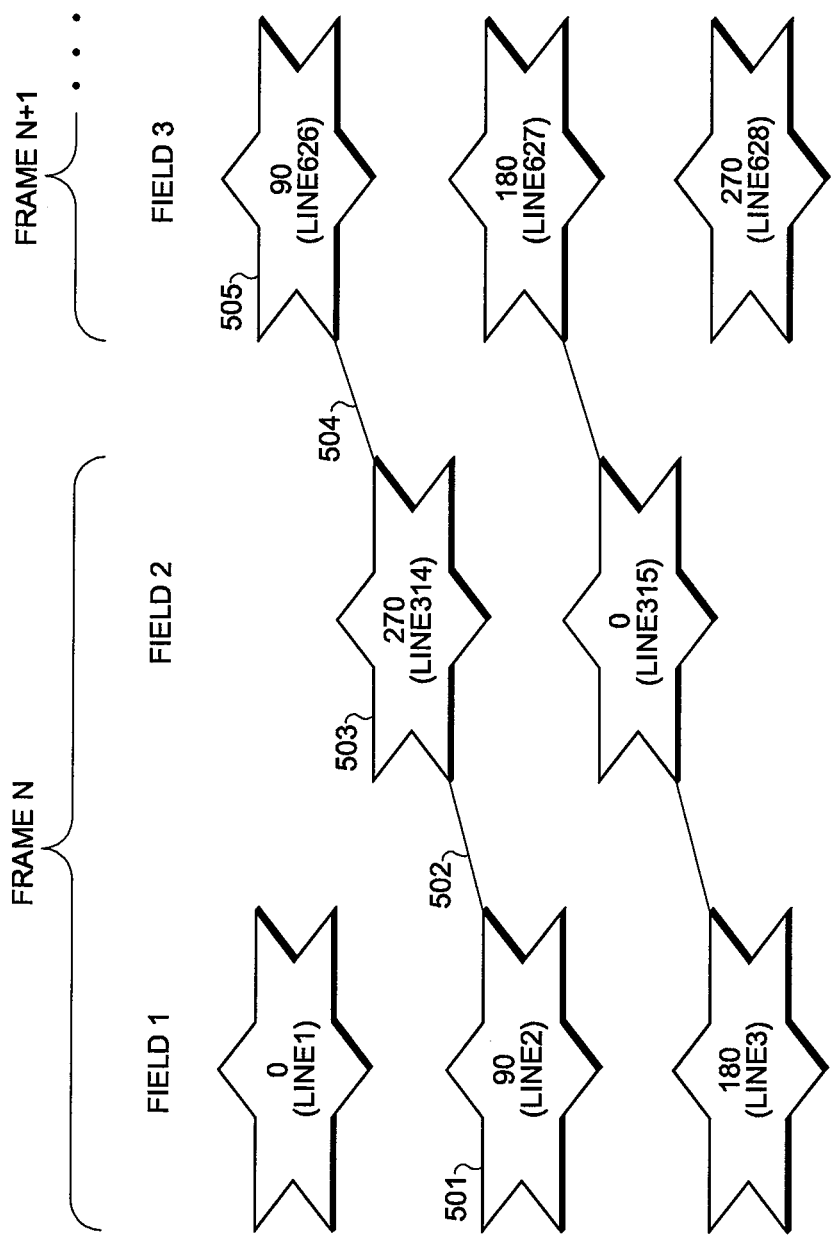
FIG. 6 shows schematically an example of field combing filter taps for the adaptive comber according to some embodiments of the application.

With respect to FIG. 6, a further PAL field chroma phase diagram is shown wherein sample values for adaptive filter taps can be seen. The figure shows a first frame (N), and parts of Field 1 and Field 2 which form the first frame and a second frame (N=1), parts of Field 3 which contain the line information spatially the same as but temporally displaced from Field 1. Thus as shown in FIG. 6 the first field (Field 1) has line 1 with a phase of 0°, line 2 with a phase of 90° and line 3 with a phase of 180°, the second field (Field 2) has line 314 (spatially between lines 1 and 2 and 312 lines away from line 2 of field 1) with a phase of 270°, and line 315 (spatially between lines 2 and 3) with a phase of 0° and a third field (Field 3) with line 626 (a temporally delayed line 1 and 624 lines away from line 2 of field 1) with a phase of 90°, line 627 (temporally delayed spatial analogue of line 2) with a phase of 180°, and a line 628 (temporally delayed spatial analogue of line 3) with a phase of 270°.

Furthermore spatial analogue of the lines where the samples are 180° phase apart are also shown in FIG. 6 by the "dashed" link. For example, line 2 501 (Field 1) and line 314 (Field 2) 503 are out of phase by 180° and shown as linked by line 502 and thus can be combed based on correlation with line 626 (Field 3) 505 linked by line 504 as line 2 501 and 626 are in phase and line 314 in anti-phase.

Furthermore line 314 in Field 2 can be considered to be closest spatio-temporal scan line to line 2 temporally displaced because of the interlaced scanning method. Therefore in some embodiments a combing operation can be performed wherein the temporal combing taps are Line 2 and Line 314 as these line taps are 180° out of phase, and the motion detection taps are Line 2 and Line 626 as these line taps are in phase (both at 90°).

In other words a suitable combing operation can therefore be represented mathematically as: (line 2−line 314)/2 to generate a temporal chroma combing value.

Furthermore motion can be detected by generating the difference between line 2 and line 626, assuming that the same 'feature' in the image covers both line 2 and line 626 as will be discussed herein.

It would be understood that this diagonal relationship can be seen to occur through the image.

With respect to the taps shown in FIG. 6 by using motion and adaptive blends of the field comb taps in some embodiments the filtering can produce better image quality for slow moving images as there is a greater probability of correlated field combing compared to fixed 2D combing.

Furthermore, adaptively field combing the embodiments of the application described herein enables intermediate stage filtering operations between one-dimensional, three line or five line combing techniques (used during images with detected motion) and multiple frame or field combing using the above tap configuration (where the video images have no motion).

Figure 2:
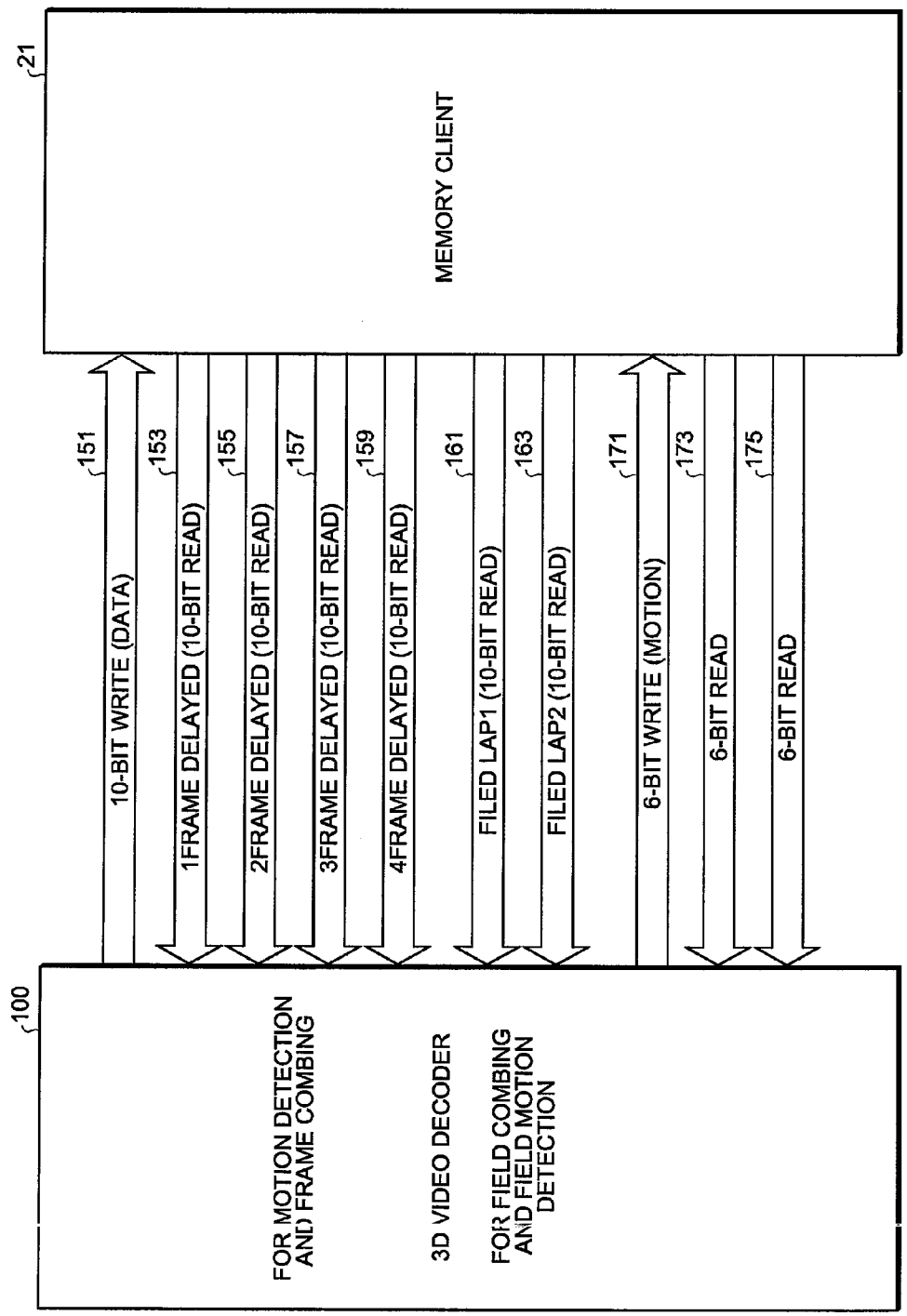
FIG. 2 shows schematically a video decoder memory client interface in further detail according to some embodiments of the application.

With respect to FIG. 2, an example of the memory client interface between memory and decoder and in such examples the field and frame taps which can be used in embodiments of the application are shown. The video decoder 100 can, for example be configured to process the video signal to perform motion detection and frame combing using a series of frame or field delayed inputs. For example as shown in FIG. 2 the decoder can read picture data with a one-frame delayed input 153, a two frame delayed input 155, a three frame delayed input 157, and a four frame delayed input 159. This configuration would thus enable a temporal delay of up to 4 frames. In some embodiments the input from the memory client to the decoder 100 can be a 10 bit read. Furthermore for field combing and field motion detection, the decoder can read picture data with a first field tap 161 and a second field tap 163 for transferring field related data from the memory 21 to the decoder 100. Furthermore in order to write the data and motion information, the interface can comprise a data 10 bit write 151 and a motion 6 bit write 171. Furthermore motion data can be read from the memory 21 to the decoder by two 6 bit read buses 173 and 175 for transferring delayed motion data for motion detection.

Figure 3:
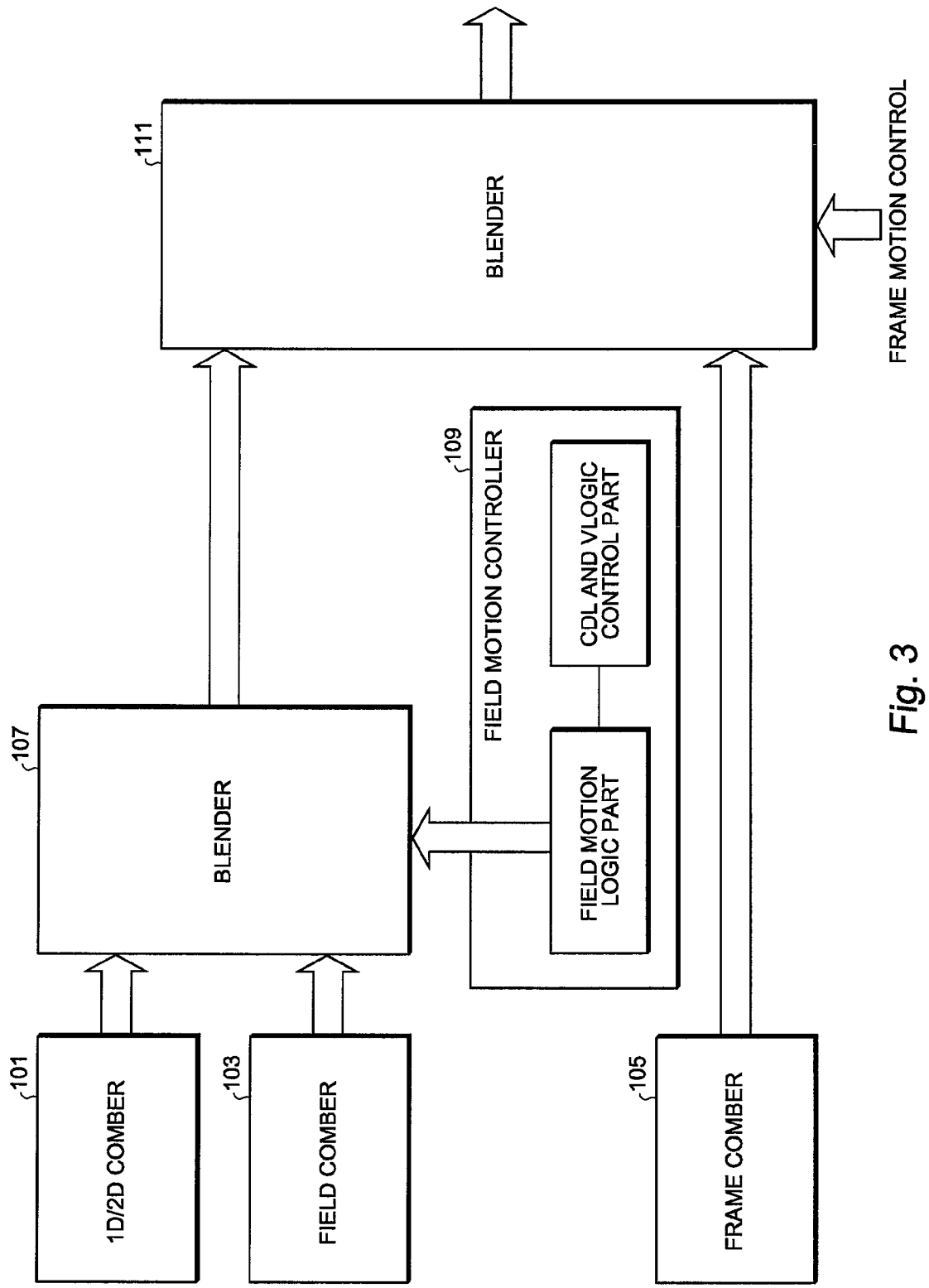
FIG. 3 shows schematically an adaptive comber in further detail according to some embodiments of the application.

With respect to FIG. 3 the adaptive comber as part of the decoder 100 is shown in further detail. In some embodiments these can comprise a 1D/2D comber circuit 101, configured to perform a 1D or 2D comb using any suitable 1D or 2D combing algorithm. The output of the 1D or 2D comb is passed in some embodiments to a first blender 107.

Furthermore in some embodiments the adaptive comber can comprise a field comber 103 configured to perform field combing. It would be understood that any suitable field combing operation could be used such as those described herein with respect to FIG. 6 where the nearest field tap can be a spatially adjacent but field delayed sample, taken with respect to a further spatially adjacent and field delayed sample 180 degrees out of phase as the original tap sample. The output of the field comber 103 can be passed to the first blender 107.

The adaptive comber can further comprise a motion controller 109. The motion controller 109 can in some embodiments further comprise a field motion logic part, CLD and V-logic control part and frame motion control part and will be discussed hereafter.

Figure 4:
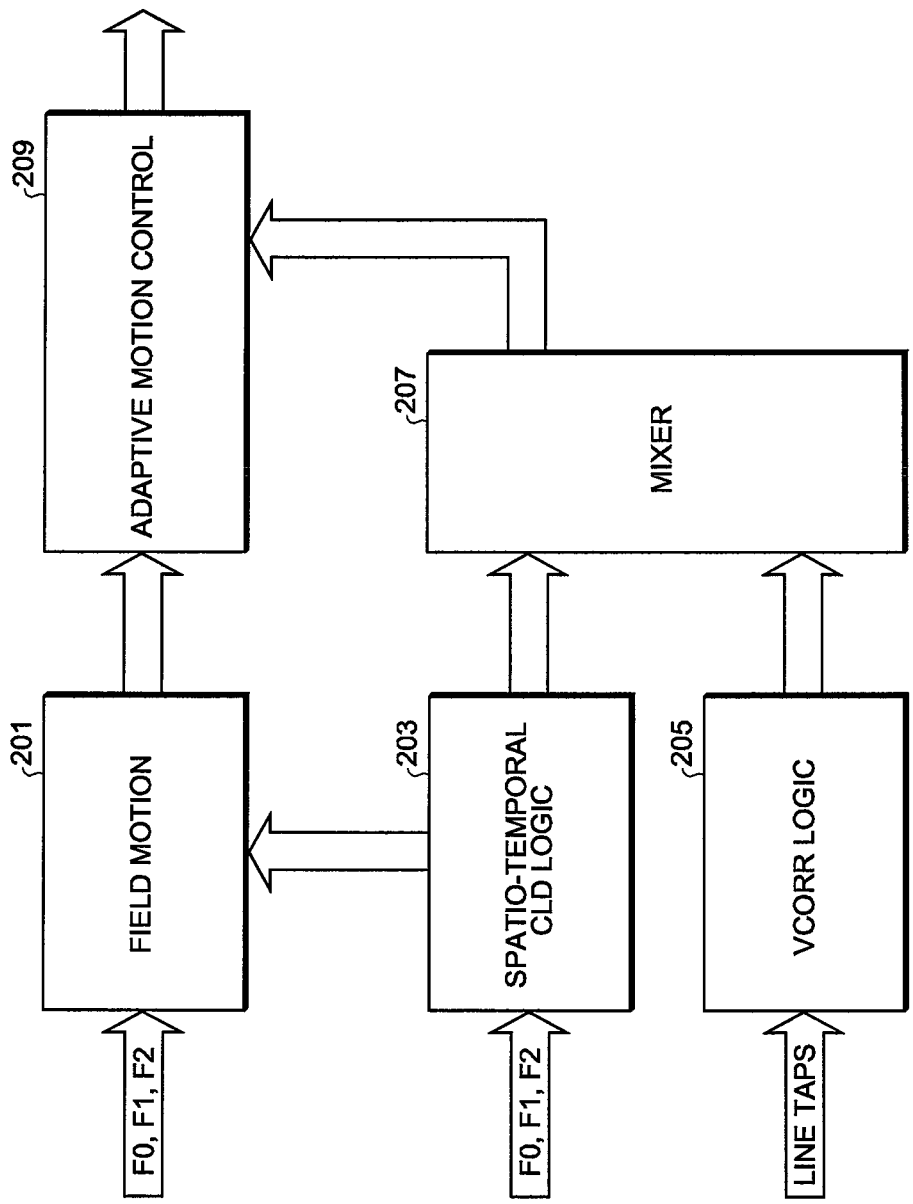
FIG. 4 shows schematically the adaptive field motion controller in further detail according to some embodiments of the application.

The motion controller can in some embodiments as shown in FIG. 4 comprise a field motion detector 201 configured to receive the fields f0 (Field 1), f1 (Field 2) and f2 (Field 3) to determine correlation between each of the fields. Furthermore the field motion detector 201 can be configured to receive an input from the spatio-temporal CLD logic 203.

In some embodiments the motion controller 109 comprises a spatio-temporal CLD logic block 203, also configured to receive the previous field(s) information and configured to determine the chroma/luma status of the input video signal of the current and previous fields. The CLD logic block 203 is configured to determine the chroma characteristics/signature. This can be done by any suitable means such as detecting for pixels which in a chroma cycle will, for each alternating sample, be nearly equal in magnitude but opposite in sign. Thus in some embodiments the addition of alternate samples among the four chroma pixels would be a low value near to 0. In some embodiments a chroma amplitude check can be carried out. The spatial/temporal CLD block thus can provide CLD control information to the field motion detector 201. This control information has spatial CLD signature status and temporal CLD signature status for better control of the motion logic. The spatial/temporal CLD logic part 203 can be configured to output the logic output to a mixer 207.

Furthermore in some embodiments the motion controller 109 comprises a V-logic or vertical correlation (VCORR)

logic 205. The vertical correlation logic 205 can be configured to receive the line tap information and provide the information to a mixer 207.

The V-logic or VCORR logic 205 thus in such embodiment can be configured to determine the degree of correlation between lines in the same field which can be used to control the 2D filtering operation where adjacent spatial lines are not similar to prevent unnecessary blurring of the image.

In some embodiments the mixer 207 can be configured to output a mixed version of the spatial/temporal CLD logic output and the vertical correlation logic 205 output to the adaptive motion controller 209.

The adaptive motion controller 209 can be configured to receive the field motion information, the mixer information and control the blender 107 and 111, the blender 111 is controlled by frame motion part of motion controller 109 (not shown in the diagram of 109) to output a combed output dependent on image data such as detection of motion of the frame, field, and the correlation between the vertical dimension pixels such that based on field motion, CLD status, V logic status, the field combing is adaptively enabled when specific image regions are likely to produce good effects when using field combing and thus prevent or reduce the generation of field combing related artifacts.

With respect to FIG. 3, there is shown a frame comber 105, the frame comber 105 can be configured to perform any suitable frame combing operation to produce an output for the pixel/line based on the pixel/line in proceeding and/or succeeding frames and pass this output to the blender 111.

The first blender 107 is configured to blend the outputs of the 1D/2D comber 101 and the field comber 103 to produce an output to the second blender 111. The first blender output can be mathematically described as:

$$FBlenderOutput = input1(k) + input2(1-k),$$

where K (can be <=1) is the blend control signal generated from the adaptive motion control 209 and the mixer 207, and the input 1 is from the field comber 103 output and the input 2 is from the 1D/2D comber 101.

The second blender 111 is configured, based on the frame motion control information from the adaptive motion controller, to further output a blended version of the output of the first blender 107 and the frame comber 105.

Figure 7:
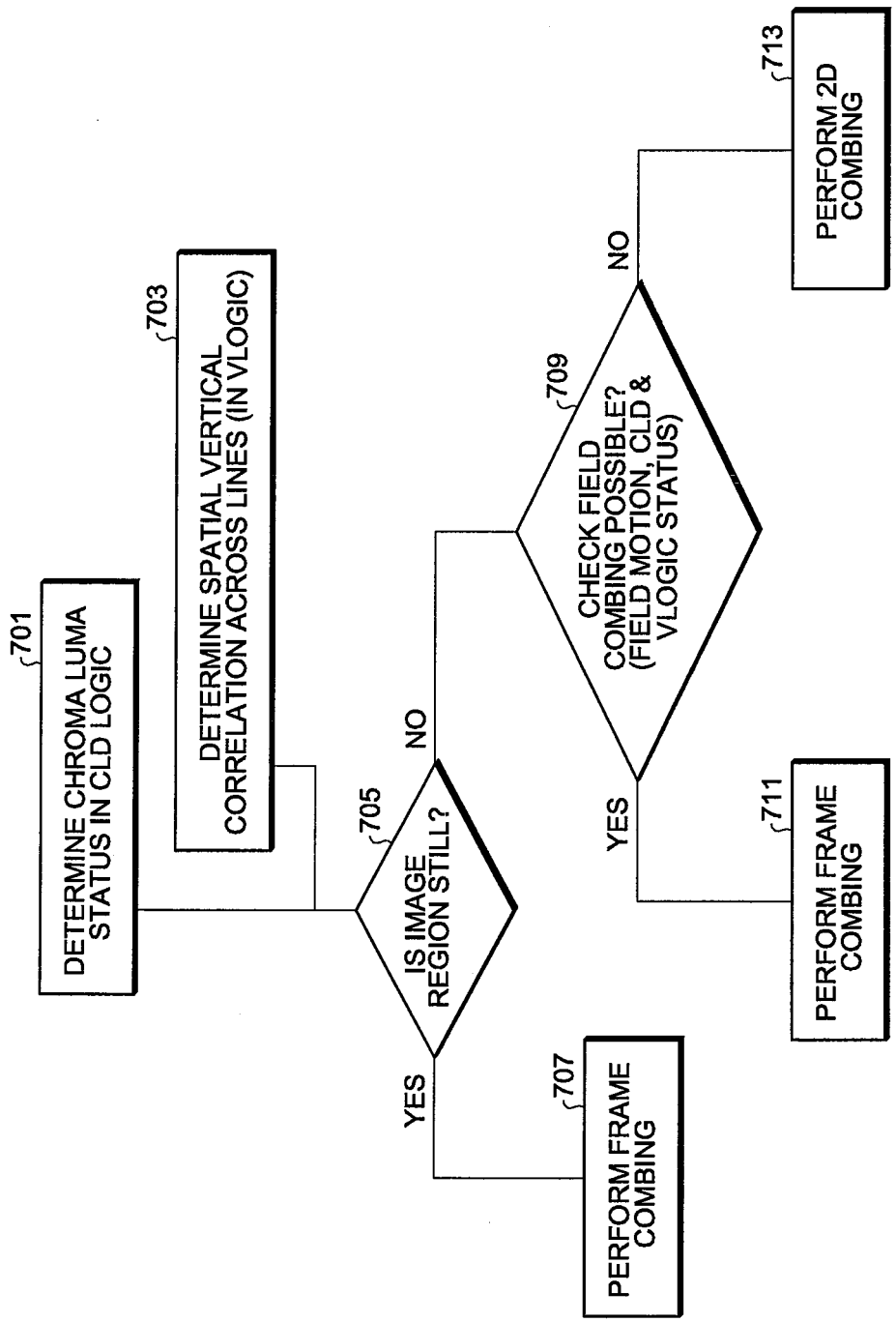
FIG. 7 shows a method of operating the adaptive comber according to some embodiments of the application.

With respect to FIG. 7 the operation of the adaptive comber and motion controller is shown in further detail.

Firstly the spatial/temporal CLD logic device 203 is configured to determine the chroma/luma status of the current field and previous fields in question.

The determination of the chroma/luma status is shown in FIG. 7 by step 701.

Furthermore the V logic or vertical correlator logic 205 can be configured to determine the spatial/vertical correlation across lines of the current field.

This operation of determining the spatial/vertical correlation across lines is carried out in FIG. 7 by step 703.

Furthermore the field motion detector 201 can be configured to determine whether or not the image region in question is still or is moving over a series of fields. In such embodiments the line taps as discussed herein with respect to FIGS. 5 and 6 can be used to determine field motion.

The motion detection operation is shown in FIG. 7 by step 705.

Where the image region is still or less than a determined field motion threshold then the adaptive motion controller can output controls to the blenders such that the frame combing operation is performed.

The operation of outputting/performing frame combing is shown in FIG. 7 by step 707.

However where the image is not still, or where the motion would produce an artifact in frame combing, for example by being greater than the determined field (or frame) motion threshold then the information provided by the chroma/luma status determination, Vlogic determination and field motion determination can be used to determine whether or not field combing is possible.

The test operation of whether or not field combing is possible is shown in FIG. 7 by step 709.

Where field combing is determined to be possible because of the CLD output, in other words determining that the video signal signature is not chroma (for example), the field motion output determining that the motion between adjacent fields is less than a further or second determined motion threshold, and the Vlogic determination indicates that the adjacent field/line tap as shown in FIG. 6 is not correlated then the field comber 103 signal, using the field comb taps as discussed herein, is output. In other words field combing is performed.

The operation of performing field combing is shown in FIG. 7 by step 711.

Where field combing is not possible, for example because of significant frame motion determination in the image, then the decoder and the motion controller is configured to control the output such that the output of the 1D and 2D combing operation is output, in other words that the decoder performs 2D combing or 1D combing.

The performing of 1D/2D combining is shown in FIG. 7 by step 713.

Thus in embodiments having adaptive control logic, the field combing is enabled at only specific image situations, thereby having less field motion artifacts and better image quality. Furthermore, in such embodiments the image quality would be better than motion compensated combing.

In some embodiments there can be considered to be an adaptive comber configured with an adaptable tap or filter selector configured to analyze the image element by element or region by region and select/blend filter elements dependent on the picture element and surrounding image region spatio, spatio-temporal and image encoding characteristics.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this application may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A video decoder comprising:
   an adaptive comb configured to generate a combed video image from an image signal; and
   an adaptive comb controller comprising:
      at least one of a vertical image correlator and a spatio-temporal image correlator configured to generate an output signal representing at least one of a vertical image correlation value of the image signal and a spatio-temporal image correlation value of the image signal,
      a field motion detector configured to determine a field motion value as a function of field motion between adjacent fields of the combed video image and to, based thereupon, generate the output signal representing the field motion value; and
      controller logic configured to generate a control signal to cause the adaptive comb to selectively comb using 2D combing, frame combing, or field combing based upon the output signal;
   wherein the adaptive comb comprises at least one blender configured to receive signals from a frame comb and a field comb;
   wherein the at least one blender is configured to selectively combine the received signals dependent on the control signal;
   wherein the control signal causes the frame comb to process a region dependent on the spatio-temporal image correlator determining the field motion value to be less than a first motion threshold value; and
   wherein the control signal causes the field comb to process the region dependent on the spatio-temporal image correlator determining the field motion value to be indicative of motion, to be greater than the first motion threshold value, and to be less than a second motion threshold value.

2. The video decoder as claimed in claim 1, wherein the adaptive comb further comprises a 2D comb, and wherein the at least one blender is further configured to receive signals from the 2D comb.

3. The video decoder as claimed in claim 2, wherein the field comb is configured to also process the region dependent on a chroma-luma status determiner determining the region does not have a chroma signature and the vertical image correlator determining that the region has vertical correlation less than a determined correlation threshold.

4. The video decoder as claimed in claim 2, wherein the 2D comb is configured to process the region dependent on the spatio-temporal image correlator determining the region has a field motion value greater than a further determined value and the vertical image correlator determining that the region has vertical line correlation greater than a determined correlation threshold.

5. The video decoder as claimed in claim 1, wherein the adaptive comb is configured to adaptively perform different combing operations on the same image.

6. The video decoder as claimed in claim 1, wherein the adaptive comb comprises a tap selector configured to select picture elements to comb, and a chroma-luma status determiner.

7. The video decoder as claimed in claim 6, wherein the tap selector is configured to select picture elements to comb dependent on a combination of: a chroma-luma status value of the image signal, a vertical image correlation value of the image, and a spatio-temporal image correlation value.

8. The video decoder as claimed in claim 6, wherein the adaptive comb comprises a tap blender configured to blend filter elements selected dependent on a combination of: a chroma-luma status value of the image signal; a vertical image correlation value of the image; and a spatio-temporal image correlation value.

9. The video decoder as claimed in claim 7, wherein the tap selector is configured to select: a first picture signal element, an in-phase picture signal element one frame away from the picture signal element, and an out-of-phase picture signal element from the adjacent field picture signal, for field combing dependent on at least the chroma-luma status value of the image indicating the image signal does not have a chroma sub carrier signature.

10. A television receiver comprising the video decoder as claimed in claim 1.

11. An integrated circuit comprising the video decoder as claimed in claim 1.

12. A video player comprising the video decoder as claimed in claim 1.

13. A chipset comprising the video decoder as claimed in claim 1.

14. A method of decoding video signals comprising:
   determining a chroma-luma status of a video signal, a vertical image correlation value of the video signal, and a spatio-temporal image correlation value and generating an output signal based thereupon;

determining a field motion value as a function of field motion between adjacent fields of the combed video image and generating the output signal based thereupon; and selectively combing the video signal using 2D combing, frame combing, or field combing, based upon the output signal;

wherein selectively combing comprises processing a region using the frame combing dependent on the field motion value to be less than a first motion threshold value; and wherein selectively combing further comprises processing the region using the field combing dependent on the field motion value being indicative of motion, being greater than the first motion threshold value, and being less than a second motion threshold value.

15. The method as claimed in claim 14, wherein selectively combing further comprises processing the region using the field combing dependent on determining that the region does not have a chroma signature, and determining that the region has vertical correlation less than a determined correlation threshold.

16. The method as claimed in claim 14, wherein selectively combing also comprises enabling 2D combing for a region dependent on determining the region has a field motion value greater than the second motion threshold value and the region having a vertical line correlation greater than a determined correlation threshold.

17. The method as claimed in claim 14, wherein selectively combing comprises performing different combing operations on the same image.

18. The method as claimed in claim 14, wherein selectively combing comprises selecting at least one picture element to comb.

19. The method as claimed in claim 18, further comprising blending combing output elements dependent on a combination of: a chroma-luma status value of the image signal, a vertical image correlation value of the image, and a spatio-temporal image correlation value.

20. The method as claimed in claims 18, wherein selecting at least one picture element to comb comprises selecting at least:
a first picture signal element,
an in-phase picture signal element one frame away from the picture signal element, and
an out-of-phase picture signal element from the adjacent field picture signal, for field combing dependent on at least the chroma-luma status value of the image indicating the image signal does not have a chroma sub carrier signature.

21. A non-transitory processor-readable medium encoded with instructions that, when executed by a processor, perform a method for decoding video claimed in claim 14.

22. Apparatus comprising at least one processor and at least one memory including computer code for one or more programs, the at least one memory and the computer code configured to with the at least one processor cause the apparatus to at least perform a method as claimed in claim 14.

23. A video decoder, comprising:
an adaptive comb configured to generate a combed video image; and
an adaptive comb controller comprising:
at least one of a chroma-luma status determiner, a vertical image correlator and a spatio-temporal image correlator configured to generate an output signal representing a characteristic of the video image, the characteristic being at least one of a chroma-luma status value of the video image, a vertical image correlation value of the video image, and a spatio-temporal image correlation value of the video image,
a field motion detector configured to determine a field motion value as a function of field motion between adjacent fields of the combed video image;
wherein the characteristic includes the field motion value; and
a controller configured to, depending upon the characteristic of the video image, determine whether 2D combing, frame combing, or field combing is to be used, and to generate a control signal to cause the adaptive comb to comb using 2D combing, frame combing, or field combing based upon that determination;
wherein the adaptive comb comprises at least one blender configured to receive signals from a frame comb and a field comb;
wherein the at least one blender is configured to selectively combine the received signals dependent on the characteristic;
wherein the controller is configured to cause the frame comb process a region dependent on the spatio-temporal image correlator determining the field motion value to be less than a first motion threshold value; and
wherein the controller is configured to cause the field comb process the region dependent on the spatio-temporal image correlator determining the field motion value to be indicative of motion, to be greater than the first motion threshold value, and to be less than a second motion threshold value.

* * * * *